INVENTORS
JOHN J. ULRICH
SOLOMON D. ULRICH
BY Brown Jackson
Boettcher Dienner
ATTORNEYS Oct. 7, 1969 J. J. ULRICH ET AL 3,470,634
MATERIALS HANDLING ATTACHMENT FOR CONVERTING A
TRACTOR TO AN ELEVATING GRADER
Filed April 17, 1968 8 Sheets-Sheet 3

INVENTORS
JOHN J. ULRICH
SOLOMON D. ULRICH
BY Brown Jackson
Boettcher + Dienner
ATTORNEYS Oct. 7, 1969    J. J. ULRICH ET AL    3,470,634
MATERIALS HANDLING ATTACHMENT FOR CONVERTING A
TRACTOR TO AN ELEVATING GRADER
Filed April 17, 1968    8 Sheets-Sheet

INVENTORS
JOHN J. ULRICH
SOLOMON D. ULRICH

BY Brown Jackson
Boettcher + Dienner

ATTORNEYS

United States Patent Office 3,470,634
Patented Oct. 7, 1969

3,470,634
MATERIALS HANDLING ATTACHMENT FOR CONVERTING A TRACTOR TO AN ELEVATING GRADER
John J. Ulrich, El Paso, and Solomon D. Ulrich Metamora, Ill., assignors to Ulrich Foundation, Inc., Roanoke, Ill., a corporation of Delaware
Continuation-in-part of application Ser. No. 529,101, Feb. 21, 1966. This application Apr. 17, 1968, Ser. No. 725,574
Int. Cl. E02f 7/02, 9/00
U.S. Cl. 37—110                                        22 Claims

ABSTRACT OF THE DISCLOSURE

Earth handling apparatus comprising a materials handling attachment for converting a tractor to an elevating grader including a ground-engaging wheel for guiding and stabilizing the apparatus during an earth removal operation, adjustable mounting means for controlling the lateral and vertical position of the wheel to thereby control the width and depth of cut, a ground-engaging shoe member which is adjustably movable with the wheel and is engageable with the side of a bank of earth so as to guide and stabilize the apparatus, a plurality of plow disc means mounted one above the other in combination to permit cutting to substantially increased depths, an inclined conveyor arranged transversely to the tractor and forwardly thereof for receiving material removed by the plow disc means and transporting such material laterally away from the tractor, and stabilizing bar means for controlling the pivotal position of the conveyor relative to its longitudinal axis.

Related application

This application is a continuation-in-part of our copending application, Ser. No. 529,101, filed Feb. 21, 1966, which is being abandoned upon the filing of the present application.

This invention relates to a novel and improved construction of earth handling equipment or apparatus adapted for convenient attachment to a tractor, motor vehicle or other prime mover.

This apparatus, broadly speaking, consists of an inclinable frame structure on which is supported a lengthwise extending continuous conveyor belt, a plow and means by which the conveyor and plow are secured to the tractor so that the lower end of the conveyor can be loaded by the plow from one side of the tractor as the tractor is propelled and the loaded material cast off the upper end of the conveyor to the opposite side of the tractor.

The apparatus is thus peculiarly useful for adapting a tractor as a grader for removing dirt from the surface of the earth as in road construction and elevating and loading the dirt into trucks or other hauling vehicles for removal. Among other uses to which the attachment may adapt a tractor or other vehicle are loading earth, loose gravel, broken macadam or other fill in highway construction, reclaiming or building new ditches along roads, casting dirt as in constructing a levee or other embankment, surface mining, building road shoulders, removing top soil, terracing fields as in combating erosion, digging canals and numerous other loading and/or casting operations where a large quantity operation is desired to be conducted in a swift, economical and efficient continuous manner.

A principal object of the present invention therefore is to provide a structure which can be conveniently thereof to an elevating grader for example, and which structure, mounted on the tractor or other vehicle will be both sufficiently rugged that it can also be efficiently and effectively operated. At the same time the structure should also be capable of ready adaption for transport by the tractor or other vehicle from one location to another.

One feature of the present invention is that the plow is suspended from a fore and aft beam which is detachably but rigidly and ruggedly mounted to the pivotally mounted U-frame which a tractor is conventionally provided for supporting a bull dozer blade or other device such as a shovel, and the inclined conveyor is provided as a separate unit having its upper end supported on a swivel-wheeled carriage and adapted so that it may be readily attached to the plow beam in front of the tractor and disposed laterally thereof with its lower end in loading position. Thus in accordance with the invention, the conveyor may be conveniently separated from the plow beam without detaching the latter from the tractor and reconnected to the rear end of the tractor. The plow beam being mounted on the bulldozer blade mount of the tractor, the plow may be raised to a desired height by elevating the bulldozer blade mount utilizing the provided controls therefor and the apparatus is ready for hauling to a new location where the conveyor can be reassembled with the plow beam in front of the tractor.

Thus a further feature of the present invention is the provision of the plow beam with an inturned rear end and a laterally extending connection arm forwardly of said inturned rear end by which the plow beam may be rigidly yet detachably mounted to one leg and bight of the shovel supporting U-frame of the tractor so as to support the plow in front of the tractor but outside the path of its travel.

Another feature of the invention is the inturning of the fore end of the plow beam and mounting it on a ground engaging wheel which although preceding the plow in the travel of the tractor is to one side of the material being loaded by the plow onto the conveyor and acts to stabilize the plow as it loads the conveyor in response to propulsion of the tractor.

Still another important feature of the invention is that said ground engaging wheel is mounted to said fore end of the plow beam by adjustable structure which permits varying the height of the wheel axle relative to the plow beam and plow suspended therefrom so as to permit control over the depth of the plow cut, and also to vary the lateral displacement of the ground engaging wheel relative to the cut of the plow.

Other features of the invention include a novel construction of sliding connection between the plow beam and inclined conveyor which permits the conveyor to be readily attached to the plow beam between the tracks of the tractor and to be as conveniently separated therefrom as when it is required to shift the conveyor from its operating position forwardly of the tractor to one behind the tractor to be transported thereby.

Still other features include a novel construction of wheeled support or carriage for the upper or outer end of the inclined conveyor which is of rugged construction so as not only to provide stability for the conveyor during operation thereof but also to retain the conveyor proper in a vertical alignment as the apparatus is moved over uneven terrain or along an incline, the same time being rigidly and immovably mounted with respect to the tractor and plow beam to which it is mounted.

Still another feature of the invention is a novel construction and/or arrangement by which the two ends of the inclined conveyor may be individually lowered and raised independently of the other end and with respect to the plow beam in order to change the conveyor reach and/or inclination.

Still other features and/or objects of the invention are a novel arrangement of bracing and suspension of the conveyor and plow beam which affords rigidity and strength as well as facilities to the assembly when mounted on a tractor and which is at the same time readily and conveniently dismountable from the tractor as when it is required to use the tractor with other equipment or attachments.

Still another feature of the invention is the novel construction of elevating means by which the two ends of the conveyor are individually and independently raised and lowered and the convenient adjustments provided for controlling the depth of cut of the plow.

Many other objects and/or features and advantages of the invention will be apparent or will become so from the detailed description of one embodiment of the invention which will now be described in connection with the several figures comprising the accompanying drawings. In said drawings:

Figure 1:
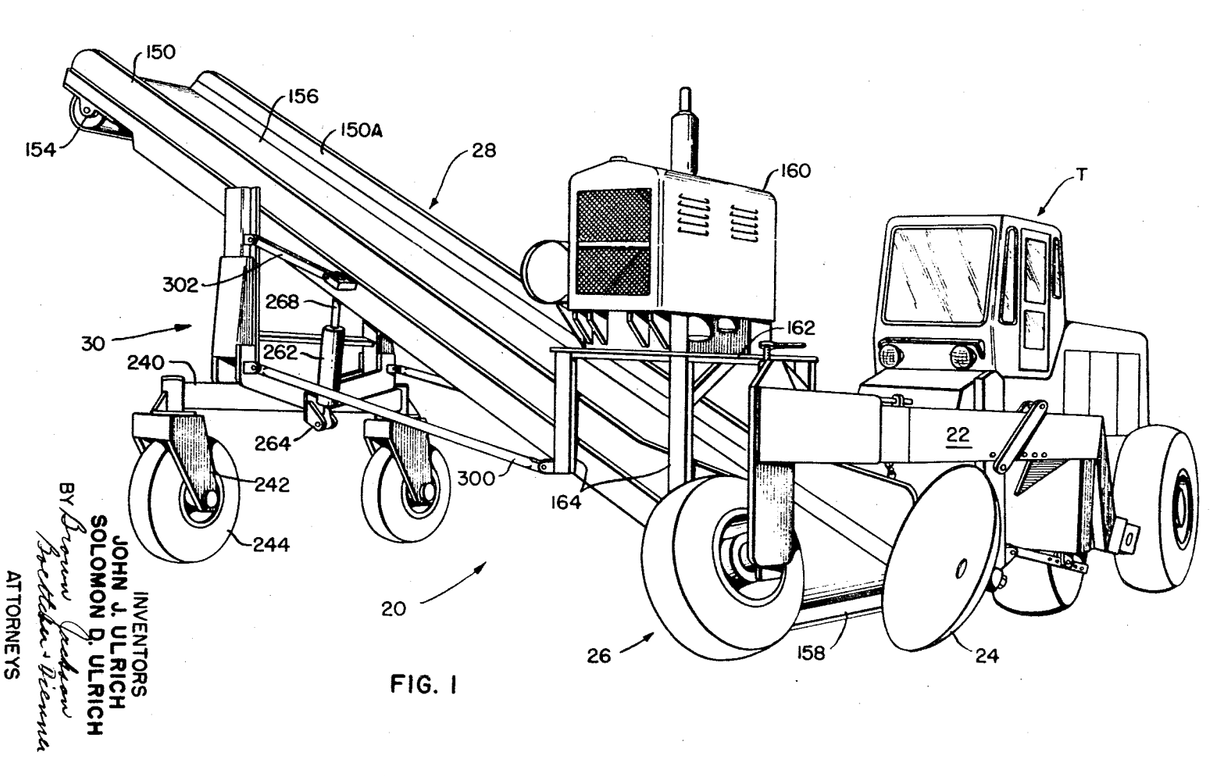
FIGURE 1 illustrates a front perspective view of one embodiment of the invention comprising the plow beam and conveyor assembled and mounted in operating position forwardly of a tractor.

Referring now to the several views wherein like parts are identified by like reference numerals, and first to FIGURE 1, an embodiment of the invention is there illustrated comprising an attachment 20 adapted for mounting to the forward end of a tractor indicated generally at T, which may be of any desired construction. For example, tractor T is shown as of the four rubber tired wheel type, although it may also be of the crawler type. Attachment 20, according to the present invention comprises two separable main parts, one of which is a fore and aft extending main plow beam 22 adapted to be attached at its rear end to the tractor T as hereinafter described. Plow beam 22 serves to support a plow disk 24 which is suspended therefrom and the cutting action of which is stabilized by a ground engaging rubber tired wheel indicated generally at 26 mounted to the fore end of the plow beam 22. Assembled with plow beam 22 is an inclined conveyor indicated generally at 28 having its upper or outer end supported by a wheeled carriage 30 and arranged with its lower or loading end in front of the tractor and adjacent plow disk 24.

Figure 2:
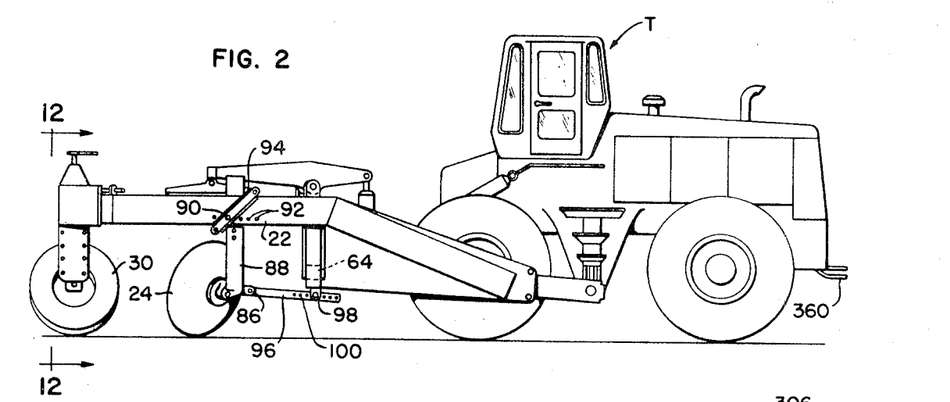
FIGURE 2 is a side elevational view thereof showing the plow beam in attached relation to the bulldozer blade mount of the tractor, the conveyor being separated therefrom.
Figure 3:
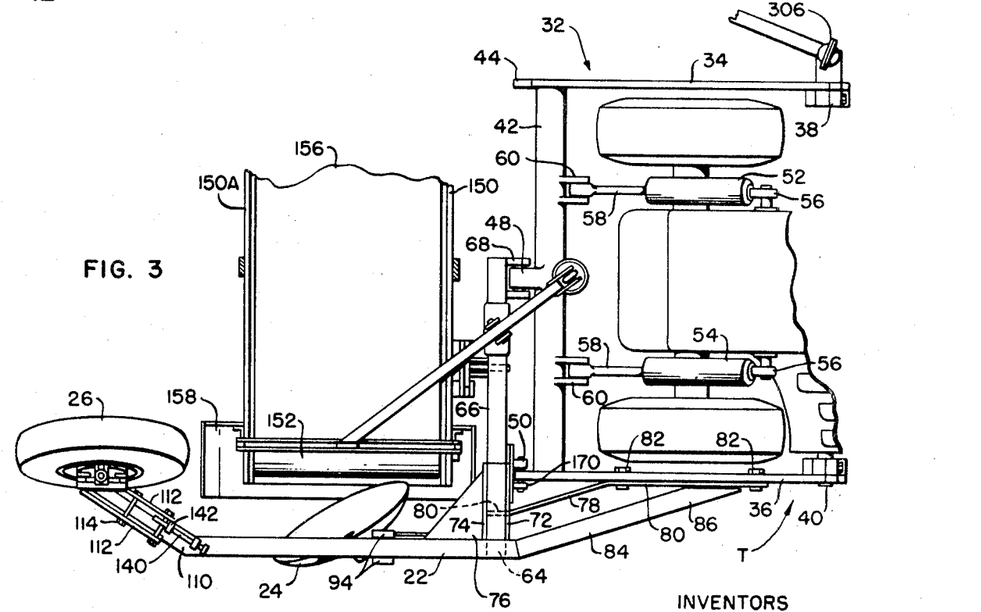
FIGURE 3 is a fragmented top plan view thereof showing the manner of attachment of the lower end of the conveyor to the plow beam and the latter to the bulldozer blade mount of the tractor.

Referring now to FIGURES 2 and 3, details in the construction of the illustrated plow beam 22 and the means for removably attaching the same to the tractor will now be described. Tractors of which tractor T is representative are conventionally provided with a U-shaped frame or mount to which a bulldozer blade, shovel or other device is fastened. Such mounting mechanism is illustrated at 32 in FIGURE 3, having arms 34 and 36 which extend along the two sides of the tractor and are pivotally connected at one end to reinforced portions of the tractor body. Said pivotal connections are illustrated at 38 and 40 in said FIGURES 2 and 3 as disposed immediately behind the tractor front wheels and below the bottom step leading to the cab of the tractor. The outer ends of said lift arms 34, 36 support tubular bar or bight 42 to which they are rigidly joined and which bar is conventionally provided with means such as hinge ears 44, 46, 48 and 50 to which a bulldozer blade or shovel part is conventionally mounted. Since such a blade forms no part of the present invention, showing thereof has been omitted. For purposes of raising and lowering the bulldozer blade, tractors are conventionally provided with hydraulic devices shown pivotally connected at 56 to opposite sides of the tractor body and have the stems 58 of their plungers or pistons pivotally connected to between pairs of rearwardly extending ears 60 provided on the rear side of the bight portion 42 of the bulldozer blade or supporting U-frame 32.

In the illustrated embodiment of FIGURES 2 and 3, plow beam 22 is shown as of strength-imparting rectangular cross section and welded to the top of a supporting post 64 also of rectangular cross section which in turn has one end of a laterally extending connection arm 66 welded thereto. As illustrated in FIGURE 3, connection arm 66 is disposed generally at right angles to the intermediate section of the plow beam 22 and is of sufficient length that it may be assembled with bight 42 of blade supporting U-frame 32, utilizing pairs of ears 68 and 70 which engage about and are pinned to forwardly projecting bosses or ears 48, 50 which serve to mount the removed blade to bight 42 of the U-shaped supporting frame 32. Depending on the particular configuration of the blade support frame of the tractor with which the invention is utilized and the height required of the plow beam, post 64 may be omitted or of a different height. To impart rigidity and strength to the plow beam, plates 72 and 74 of heavy gauge metal are welded between post 64 and arm 66 on the two sides thereof. A triangular shaped reinforcing metal plate of heavy gauge is also provided at 76 but welded to plate 74 and the inner side of plow beam 22. To further increase the strength and rigidity of the construction, a reinforcing metal plate is also provided at 78, which is face welded at 80 to the inner side of post 64, extending through a provided slot in plate 72. Plate 78 includes an angled portion 80 by which it is suitably bolted to arm 36 of the U-shape frame 32 as at 82 and to which a downwardly and in-turned rear end portion 84 of the plow beam is appropriately welded as at 86. It will be understood that the spacing of attachment ears 68 and 70 will be varied in accordance with the location and style of bosses 48 and 50 on the bulldozer blade frame of the particular tractor for which the attachment is adapted. Also, depending on the shape of bight portion 42, and the manner utilized for mounting the bulldozer blade to its supporting frame, other variations in the manner of mounting the plow beam 22 to said U-frame 32 may be required.

Plow disk 24 may be secured and supported on plow beam 22 by any suitable means. In FIGURES 2 and 3, plow disk 24 is shown suspended from a plural apertured bracket member 88 which is secured to plow beam 22 by bolt 90 passing through an appropriate one of apertures 92 therein. Locking plates 94, provided on opposed sides of plow beam 22 and appropriately bolted together serve to resist turning of supporting member 86 on the plow beam and thereby the location of the plow disk 24, once it has been located in position and at a proper angle for efficient loading onto the conveyor. The position of plow disk 24 is also braced by brace 96 shown bolted at 86 to bracket 88 and to portion 98 depending from post 64 utilizing appropriate one of openings 100 which will hold the plow disk at the required angle.

Figures 12, 13, 14:
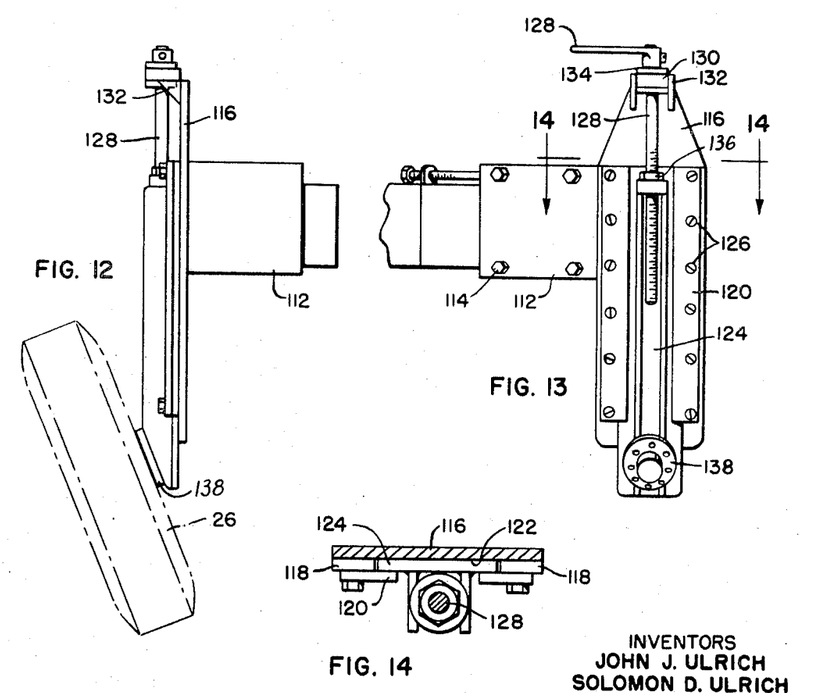
FIGURE 12 is an end view taken along lines 12—12 of FIGURE 2 and illustrates details in the mount of the ground engaging wheel to the inwardly turned fore end of the plow beam.
FIGURE 13 is a view taken from the left hand side of FIGURE 12 and shows further details by which one may alter the related height of the axle of the ground engaging wheel to the plow beam and also the laterally offset relation of said wheel to the longitudinal axis of the plow beam.
FIGURE 14 is a sectional view taken along lines 14—14 looking in the direction indicated by arrows and shows further details in the construction of the adjustable mount for the ground engaging wheel of the plow beam.

As mentioned, the fore end 110 of the plow beam 22 is supported by a rubber-tired ground engaging wheel 26 which serves to stabilize the cutting action of the plow disk 24 in loading the conveyor 28. Preferably wheel 26 is canted as illustrated in FIGURE 12 and the fore end 110 of the plow beam on which it is mounted is inclined inwardly so that wheel 26 lies to the inside of the material in the path of the plow 24. Wheel 26 thus serves to control the depth of cut by plow disk 24 and the invention includes means for adjusting the related height of the axle mounting on which wheel 26 turns relative to the plow beam in order to permit adjustment of the plow disk cut depth. The mount for wheel 26 also permits adjustment of wheel 26 toward and away from the path of plow disk 24 to improve stability of the plow action as when its depth of cut is changed.

As illustrated by FIGURES 12–14, when considered with FIGURE 3, the mounting of the forward located ground engaging wheel 26 which accomplishes these purposes comprises a pair of side plates 112 on opposed sides of fore end portion 110 of the plow beam and which are rigidly clamped against said fore end of the plow beam by upper and lower pairs of bolts 114. At 116 is a vertically disposed bracket to which the wheel mount is adjustably mounted and which member 116 is appropriately welded to the ends of side plate 112. Vertically disposed bracket 116 comprises a plate having a pair of vertically disposed spacer elements 118 welded to its vertical margin and having clamp bars 120 bolted thereto which lap the space between spacers 118 and provide a guideway 122 in which a slide member 124 is vertically adjustable on loosening bolts 126. At 128, as shown best in FIGURE 13, is a ratchet device which includes a threaded member rotatably mounted within bearing 130, between ears 132 secured to slide bracket 116 and supported against longitudinal movement in bearing 130 by washers 134 rigidly connected as by weldments to threaded member 128. At 136 is an internally threaded nut welded to slide 124 with which member 128 has threaded engagement. On the lower end of slide 124 is a swivelly mounted wheel mount 138 to which wheel 26 is removably connected by bolts or other suitable means. It will thus be appreciated that by appropriate turning of ratchet 128, its threaded member may be threaded into or out of nut 136 to adjust the height of wheel mount 138 and thereby the height of the plow beam 22 and the depth to which the plow disk cuts. The spacing of ground engaging wheel inwardly and outwardly relative to the plow beam 22 and for the tracking of the tractor wheels is obtained by loosening bolts 114 which permits their adjustment longitudinally of inturned fore end 110 of the plow beam by rotation of threaded member 140 inwardly or outwardly of internally threaded nut 142 which is welded to one of said plates 112. Once the relative position of wheel 26 to the plow beam 22 has been thus adjusted, bolts 114 are retightened to again tightly clamp plates 112 to the opposite sides of the fore end 110 and against further axial movement.

Figures 4, 8, 9, 10:
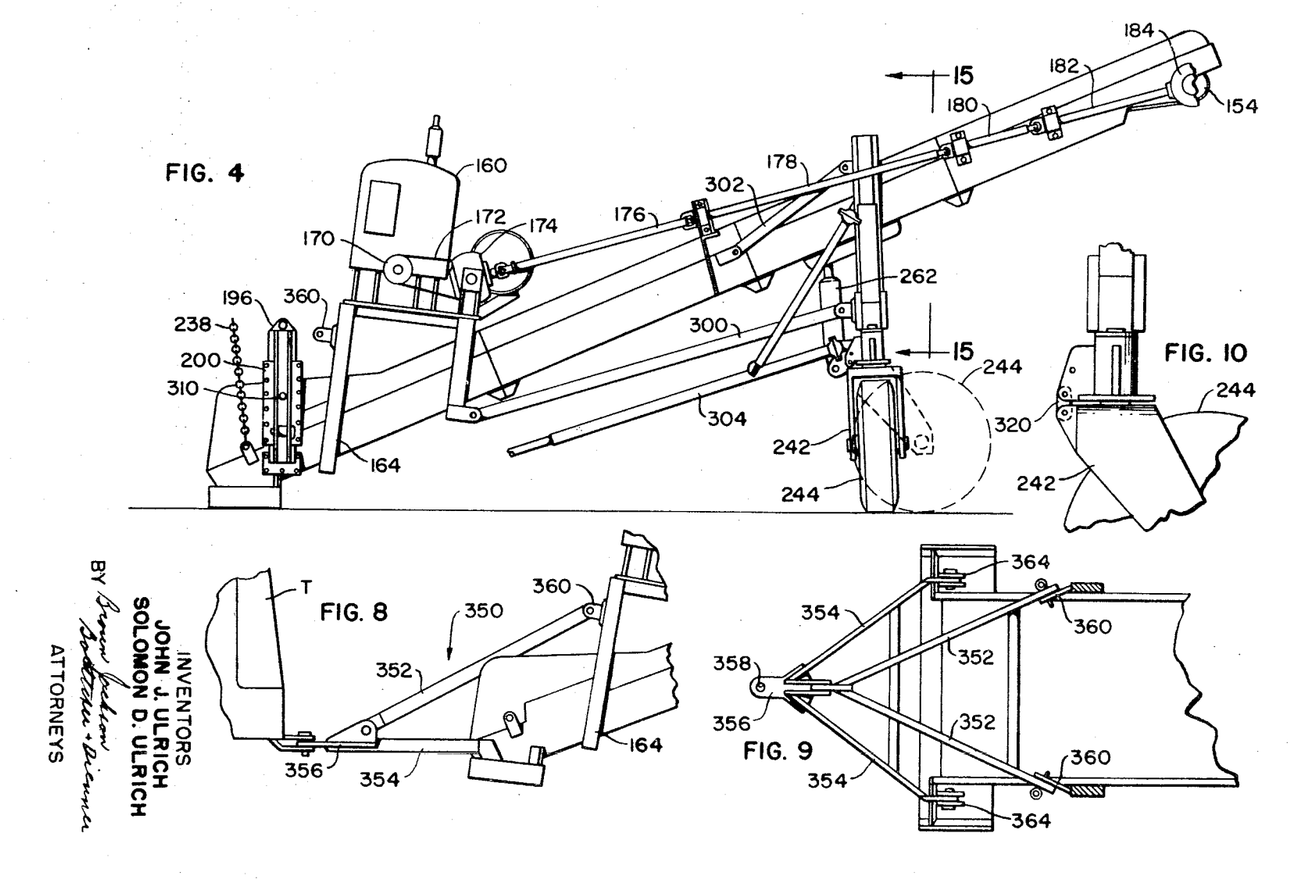
FIGURE 4 is a side elevational view of the inclined conveyor shown separated from the plow beam, but with its parts otherwise arranged in operating position as they would be arranged when mounted to the plow beam and in front of the tractor.
FIGURE 8 is a fragmented side elevational view illustrating the structure and the mounting thereto by means of which the conveyor may be hitched to the rear of the tractor for transport.
FIGURE 9 is a top plan view of the hitching structure illustrated in FIGURE 8.
FIGURE 10 shows the arrangement of the wheels of the conveyor supporting carriage when disposed for transport and shows the otherwise swively mounted wheels secured in fixed relation for effective guidance of the conveyor when pulled behind the tractor.

Now turning to the conveyor 28 itself, the conveyor may be of any suitable construction. Preferably, however, it is of a construction as illustrated and described in R. M. Ulrich U.S. Patent 3,111,779, the pertinent portions of which are understood to be included herein by reference. As illustrated in FIGURES 1 and 4, such conveyor comprises a frame embodying two spaced longitudinally extending side walls 150 and 150A which are joined together at spaced locations along their length by appropriate bracing not shown, and have upper and lower cylinders 152 and 154 as well as intermediate cylinders (not shown) rotatably mounted to the opposed side walls, and which support a continuous belt 156 which is preferably formed of a rugged rubber composition that is suitably cleated to better hold the earth or other material loaded thereon by plow disk 24 adjacent the lower end thereof. The lower end of the conveyor is provided with a suitable wear plate 158 which is mounted to the opposed side walls 150, 150A of the conveyor and serves to prevent accidental engagement of the conveyor belt 156 with the surface over which the apparatus is driven by the tractor T in a loading and/or casting operation. The upper end of the inclined conveyor 28 is supported on a wheel carriage 30 as previously mentioned and details of which will be more specifically described later. Although any suitable means for obtaining rotation of the belt 156 to effect its earth elevating function may be utilized, in the illustrated embodiment the prime mover is illustrated as a diesel powered engine 160, supported on a platform 162 supported by four legs, 164, suitably welded to the opposed side walls 150 and 150A adjacent to the lower end of the inclined conveyor. In this location it affords stability to the conveyor and is also between the tracks or path of the tractor so that the weight thereof and of the conveyor can be best handled by the tractor in its propulsion of the apparatus comprising the plow beam and conveyor in a grading operation, for example. Operation of engine 160 serves to turn sheave 170 which drives a belt 172 to rotate a sheave of gear box 174 which in turn rotate telescopic drive shafts 176, 178, 180 and 182 which are suitably journalled along one wall of the conveyor and are drivingly connected together and to a second gear box 184 which turns cylinder 154 at the top of the conveyor and imparts movement to belt 156.

Figures 5, 6:
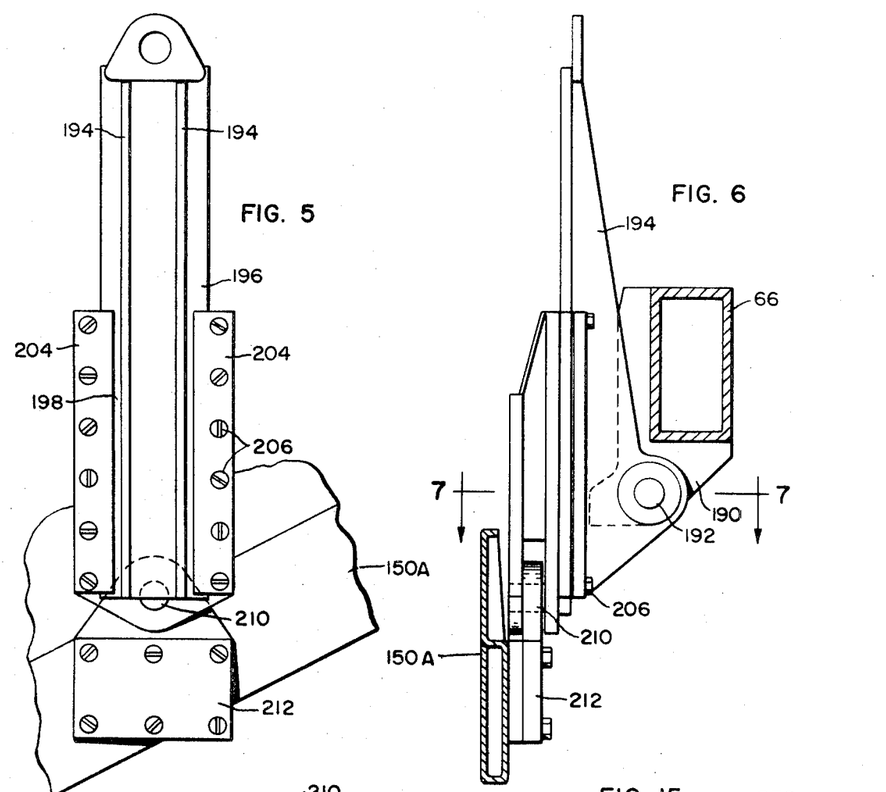
FIGURE 5 is an enlarged fragmented view of the lower end of the conveyor illustrating the means by which the same is removably and adjustably connected to the transverse connection bar of the plow beam.
FIGURE 6 is a sectional view taken through a wall of the conveyor and transverse connection bar of the plow beam at right angles to FIGURE 5 to show further details of the connection of the conveyor to said connection bar of the plow beam.
Figure 7:
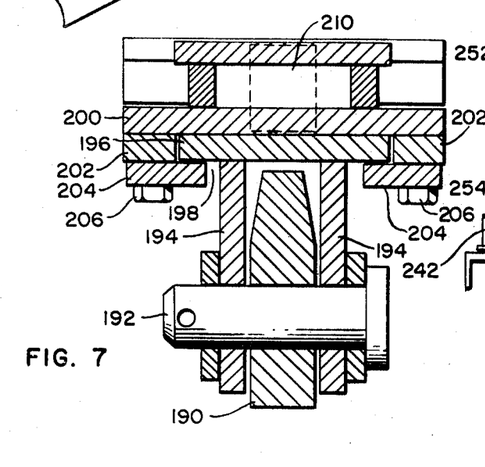
FIGURE 7 is a horizontal sectional view taken along lines 7—7 of FIGURE 6 and shows further details in the connection of the conveyor to said connection arm of the plow beam.

Turning now to FIGURES 5, 6 and 7 which are to be considered in conjunction with FIGURE 3, novel means are provided for detachably yet rigidly mounting the conveyor adjacent its lower end to the transverse connection bar 66 of the plow beam and so as to provide a rigid, rugged assembly of the conveyor with said plow beam and the tractor T itself. Referring therefore to said mentioned views, connection arm 66 of the plow beam 22 which has been described as having spaced pairs of ears 68 and 70 on its rear side by which it is pinned to bosses 48 and 50 on bight 42 of the tractor U-frame mount 32, is also provided with a depending apertured boss 190 on its forward side which is shown located between said spaced pairs of ears. Rotatably connected to said boss 190 by means of a removable pin 192 are a pair of ears 194 disposed on opposite sides of said boss. As shown best in FIGURE 6, said ears 194 are of substantial longitudinal vertical dimension and project from a vertically extending slide bracket 196 to which they are edge welded. Slide bracket 196 is slidably received within a guideway 198 constituted by a slide assembly comprising a vertically extending back plate 200 having a pair of vertical spacers 202 secured along its two vertical edges and a pair of clamp plates 204, which are bolted thereto as by bolts 206. Plate 200 has its lower end pivotally connected as by pin 210 to swivel plate 212, which is rigidly bolted to adjacent wall 150A of the conveyor.

Figure 11:
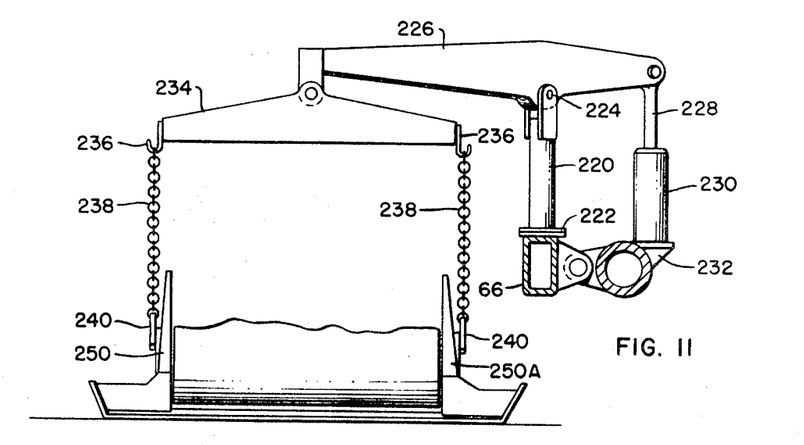
FIGURE 11 is a fragmented sectional view illustrating one arrangement of supporting the lower end of the inclined conveyor and which permits adjusting the relative height thereof to the plow beam and independently of the height of the upper or outer end of the inclined conveyor.

As shown in FIGURE 11 considered with FIGURES 2 and 3, on one side of the mentioned slide assembly is a vertical extending upright or stanchion 220 welded or otherwise mounted on a suitable supporting base plate 222 of connection arm 66. Atop stanchion 220 is pivotally connected a lift arm 226 to turn about a horizontal axis defined by pin 224 under the operation of hydraulic cylinder 230 shown best in FIGURE 11 as mounted on portion 232 of bight portion 42 of blade supporting U-frame 32 and having stem 228 of its piston attached to the remote end of lift arm 226. The other, or near end of lift arm 226 supports a second lift or balance arm 234 pivotally connected thereto midway of its ends and centered over the lower end of the conveyor 28, its opposed ends being provided with hooks 236 from which depend chains 238 fastened at their lower ends to connections 240 secured to the opposite side walls 250 and 250A of the conveyor. Chains 238 and their connections are adjusted to support the lower end of the conveyor essentially level and it will be appreciated that by suitable operation of hydraulic cylinder 230, its piston 228 may be caused to rock lift arm 226 about its pivotal connection 224 and thereby to effectively raise or lower the lower end of the conveyor 28. The assembled relation of slide bracket 196 within the guideway 198 defined by the assembly constituting plate 200, spacers 202 and clamp plates 206 to which the lower end of the conveyor is swivelly connected by swivel plate 212 and pin 210 accommodate said raising and lowering while also retaining said lower end of the conveyor in connection with arm 66 of the plow beam 22 and thereby the tractor. Advantageously the thickness of spacers 202 may be such as to require loosening bolts 206 to accommodate said vertical adjustment of the conveyor, after which bolts 206 are retightened in order to securely clamp plate 200 and plates 204 against slide bracket 196 to more positively retain the lower end of the conveyor in its required position relative to the plow disk 24 during propulsion of the tractor for maximum efficiency in the loading operation.

Figure 15:
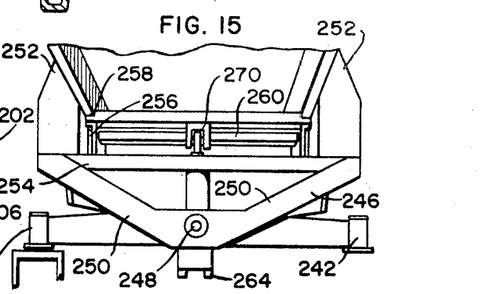
FIGURE 15 is a vertical sectional view taken along lines 15—15 of FIGURE 4 looking in the direction indicated by the arrows but with the wheels of the conveyor carriage turned to the positions indicated by phantom lines in said FIGURE 4.

Turning now to FIGURES 4 and 15, to be considered in conjunction with FIGURE 1, the wheeled carriage 30 on which the upper end of the inclined conveyor 28 is supported will now be described. From said views it will be seen that carriage 30 comprises a main horizontal support member 240, provided with vertical bearings 242 at its opposite ends in which are swivelly mounted forked members 242 between which a respective one of a pair of wheels 244 are mounted to freely rotate on horizontal axles. Pivotally secured to horizontal member 240 by suitable rotary connection 248 is a cradle 246. As shown best in FIGURE 15, cradle 246 includes inclined portions 250 on either side of said pivotal connection 248 which terminate in vertically extending upright portions 252 which act as guideways for restricting lateral sway of the conveyor 28. Between the uprights 252 and immediately above their junction with inclined portions 250, is a cross brace 254. Uprights 252 are also longitudinally recessed at 256 along their inner side to comprise guideways in which are keyed projections 258 of mount 260 which support the conveyor 28. Adjustment of the height of the upper end of the conveyor is conveniently obtained independently of the adjustment of the height of the lower end of the conveyor and thereby the inclination of the conveyor and its reach by means of hydraulic cylinder 262 which is shown pivotally mounted to bracket 264 rigidly connected to cradle 246 immediately below pivotal connection 248 as shown best in FIGURE 1 and having stem 268 of its piston pivotally connected to the underside of mount 260 which supports the upper end of the conveyor. Operation of hydraulic cylinder 262 thus serves to raise and lower mount 260, vertical movement of which is guided by projections 258 keyed in guideways or recesses 256 of the uprights of cradle 246.

To complete the assembly of the wheel carriage 30 with the conveyor so as to permit a rugged, yet yielding structure, as when operating the conveyor over rough terrain and to accommodate said height adjustments of the two ends of the conveyor in the manner described, a first pair of lower braces 300 are provided on either side of the conveyor which are pivotally connected at one end to the rear one of the engine platform uprights 164 and at their opposite ends to cradle 246 adjacent the outer ends of the horizontal main supporting member 240 on which said cradle pivots. A pair of upper braces 302 are also provided which are pivotally connected at one end to adjacent the upper end of uprights 252 of cradle 246 and to the side walls 150 and 150A of the conveyor 28. The thus described pivotal connections of upper braces 302 and lower braces 300 permit elevation of the conveyor relative to uprights 252 of the cradle by the described operation of hydraulic cylinder 262 while the pivotal mounting of the cradle 246 at 248 on the horizontal cross supporting main beam 240 of the wheeled carriage 30 permits the conveyor 28 to be maintained essentially level as the carriage wheels 244 follow the terrain or the apparatus is moved up or down an incline. This provides for maximum efficiency in loading and elevating of the material loaded on its lower end by plow disk 24 for casting from the top of the conveyor 28.

As previously described and is apparent from FIGURE 3, the connection of the conveyor to connection arm 66 of the plow beam is located for maximum effectiveness in movement of the conveyor by forward propulsion of tractor T. To assist in maintaining the conveyor at its properly angled relation to the plow 24 in the forward travel of the tractor T and to limit side sway and resistance of the outer end of the conveyor to said movement of the tractor, a telescoping brace arm 304 is connected at one end by a ball and socket connection to the trailing end of of the horizontal supporting beam 240 of the wheeled carriage 30 and at its other end, also by a ball socket connection, to the tractor T as at 306 immediately adjacent the pivotal connection of frame 22 with the tractor body at 38.

As thus described, and illustrated for example by FIGURE 1, the conveyor 28 and plow beam 22 are in operating position to perform a grading or other casting operation in response to forward movement of the tractor. The conveyor, as described, however, is also readily detachable from the plow beam for relocation to a position behind the tractor for transport, as when moving from one location to the other. This is obtained by dismounting brace arm 304 from its connection with frame 32 at 306 and pulling pin 192 to separate the lower end of the conveyor from its connection to plow beam arm 66. Prior to removal of pin 192 from the slide bracket connection of the conveyor with arm 66 to effect separation of the conveyor from arm 66, it is desirable to first connect slide bracket 196 to slide plate 200 by inserting a pin 310 through provided aligned openings 312 therein. Alignment of these openings to permit location of pin 310 may be conveniently accomplished by raising the lower end of the conveyor to the required height by operating hydraulic cylinder 230. Upon removal of pin 192 disconnecting the conveyor including slide bracket 19 from arm 66, the hydraulic cylinder 230 may be then operated to lower the conveyor's lower end to the ground which is then released from its connection to balance arm 234 by disconnecting chains 238 from hooks 236. Thereafter hauling frame indicated generally at 350 in FIGURES 8 and 9 may be connected to the front or lower end of the conveyor. Said hauling frame 350 as shown in said FIGURES 8 and 9 comprises an upper A frame 352 and a lower A frame 354, both of which are suitably cross braced and connected to an attachment member 356, provided with an opening 358 by which it may be suitably pinned to hitch 360 on the tractor (FIG. 2). The free ends of the upper A frame 352 are, however, first pinned to provided connection portions 360 on uprights 164 (FIGURES 4 and 9) and the free ends of the lower frame 254 are pinned to connections members 365 (FIG. 9) located at the bottom end or terminus of the conveyor. As mentioned, carriage wheels 244 are swively connected to the carriage which assists in manipulating the conveyor out of its position forwardly of the tractor and assembled with the plow beam 22 to its second position behind the tractor for transport purposes. Once the conveyor 28 has been located behind the conveyor, however, its wheels 244 may be fixed by link 320, as shown in FIGURE 10, against swivelling whereby it will more satisfactorily follow the tractor as it is pulled therebehind. Thereafter hydraulic cylinders 54 and 52 may be operated to raise blade frame 32 of the tractor and thereby plow beam 22 and its plow disk 24 and ground engaging wheel 26 off the surface and the tractor is ready to transport the apparatus to the next location.

From the aforesaid description, the operation of the attachment, its mode of assembly into operating position and for transport will be readily apparent. It will furthermore be appreciated that a highly practical and efficient structure has been described and illustrated by which all of the recited objects, advantages and features of the invention may be obtained.

Figure 16:
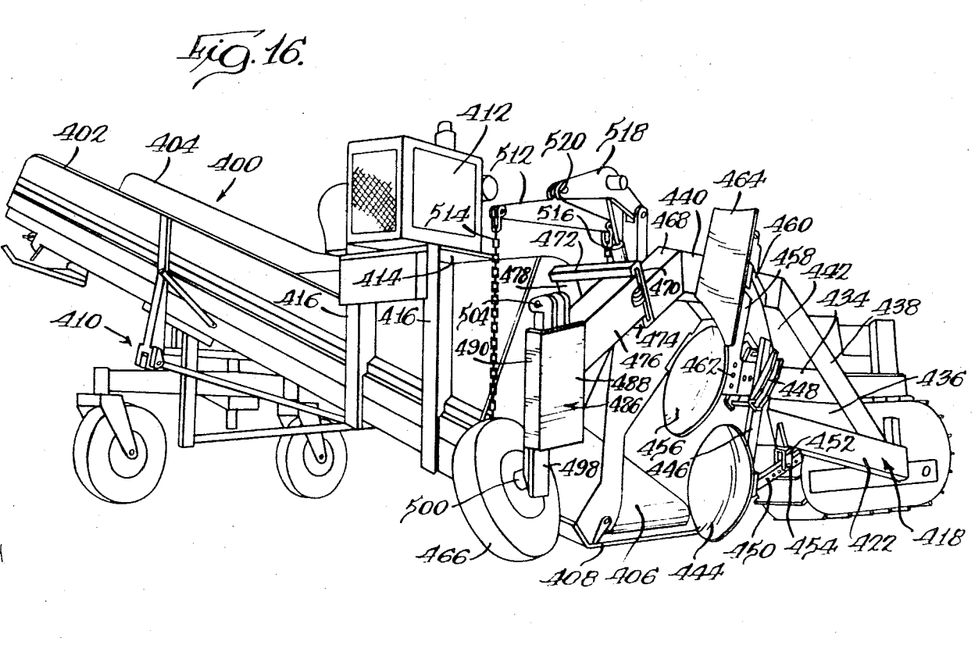
FIGURE 16 is a perspective view of an alternative embodiment of the present invention showing a modified form of plow beam and conveyor assembled and mounted in operating position forwardly of a tractor.
Figure 17:
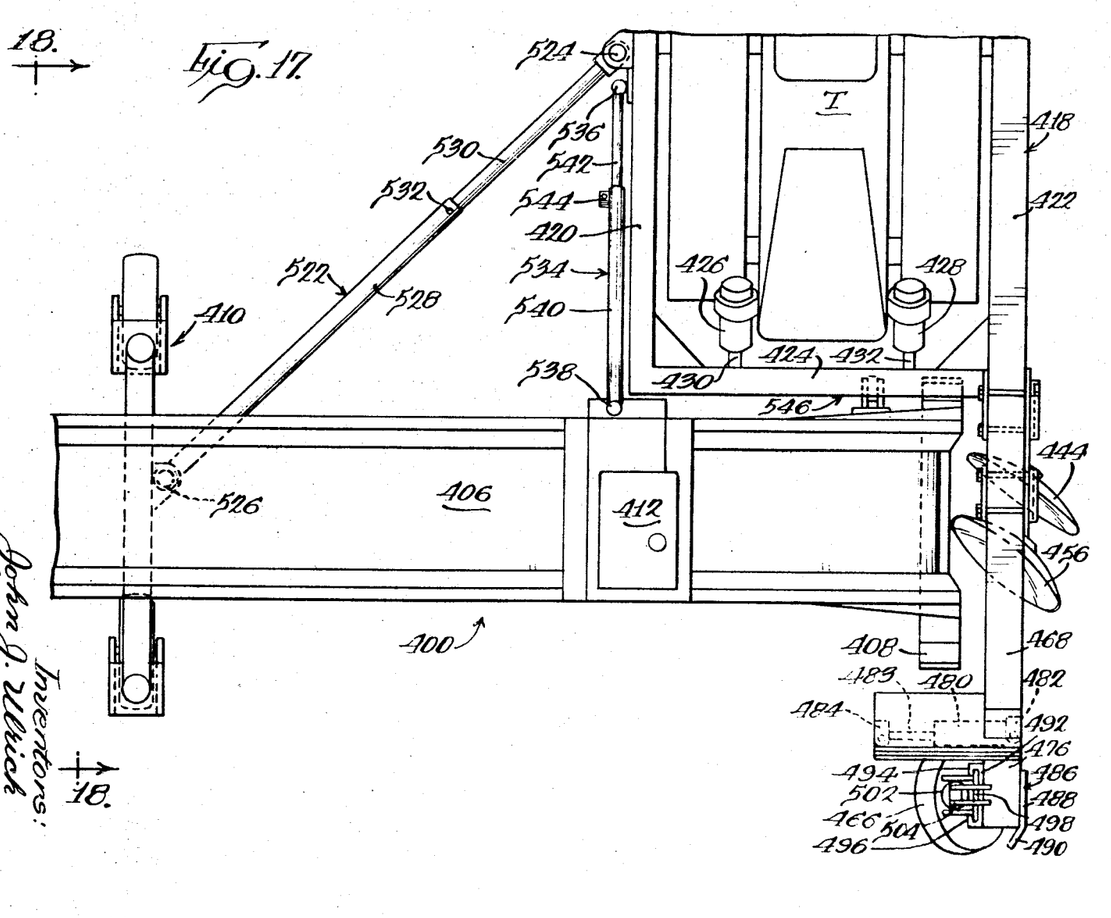
FIGURE 17 is an enlarged fragmentary top plan view of the plow beam and conveyor assembly of FIGURE 16.
Figure 18:
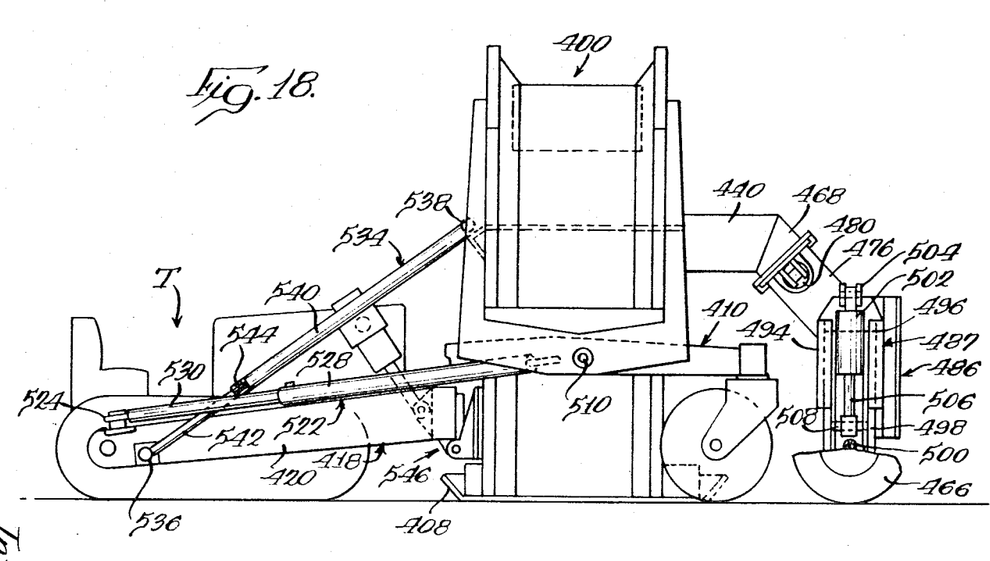
FIGURE 18 is a side elevational view looking approximately in the direction of the arrows 18—18 of FIGURE 17.

Reference is now made to an alternative embodiment of the invention as shown in FIGURES 16–18. FIGURE 16 shows a conveyor 400 having longitudinal side walls 402 and 404, and endless conveyor belt 406, and a large wear plate 408 connected to the side walls at the lower end of the conveyor for riding along the ground surface when the earth handling apparatus is in operation. The upper end of the inclined conveyor 400 is supported on a wheel carriage 410, and an engine 412 is supported on a platform 414 which is carried on four upright legs 416, the legs 416 having their lower ends welded to the side walls of the conveyor. The engine 412 drives the endless belt 406 in the manner described earlier herein.

The tractor T is equipped with a U-shaped frame 418 (best shown in FIGURE 17) having side arm portions 420 and 422 which extend along the two sides of the tractor and are pivotally connected at their rear ends to reinforced portions of the tractor body. A transverse bar 424 interconnects the forward ends of the side arms 420 and 422 and forms the third side of the U-shaped frame member. FIGURE 17 shows a pair of hydraulic cylinders 426 and 428, the cylinders having piston rods 430 and 432. The hydraulic cylinders 426 and 428 are carried by the tractor T, and the piston rods 430 and 432 are connected to the transverse bar 424 so as to permit raising and lowering of the U-shaped frame 418.

Referring to FIGURE 16, a first lower plow beam member 434 is welded to the top of a plate 436 which in turn is welded to the top of the side arm 422 of the U-shaped frame 418. An inclined plate 438 extends upwardly along the rear edges of the plate 436 and plow beam 434, the inclined plate 438 having its lower end welded to the top of the side arm member 422. A second upper plow beam member 440 extends forwardly from the upper end of the inclined plate 438, and a supporting plate 442 is welded into the assembly above the lower plow beam 434 and beneath the upper plow beam 440 so as to support the latter. It will thus be seen that the lower and upper plow beams 434 and 440 together with the intermediate plates 436 and 442 and the inclined plate 438 form a welded assembly supported from the side arm 422 of the U-shaped frame 418 which is pivotally carried by the tractor T.

A first plow disc 444 is mounted on the lower end of a supporting bar 446, the upper end of the bar 446 being adjustably clamped to the lower plow beam 434 by a clamp member 448. In addition, a supporting strut 450 extends rearwardly from the lower end of the supporting bar 446 to a bracket 452 which is welded to the forward end of the side arm member 422. The strut 450 is pinned to the bracket 452 at 454 and it will be understood that a plurality of holes are formed in the strut 450 to permit adjustment of the position of the first plow disc 444.

A second plow disc member 456 is mounted on the lower end of a supporting bar 458, the upper end of the bar 458 being adjustably clamped to the upper plow beam 440 by a clamp member 460. The lower end of the supporting bar 458 is pinned to the forward end of the first plow beam member as shown at 462, and it will be understood that a plurality of holes are provided in the lower plow beam 434 to permit adjustment of the position of the supporting bar 458 and upper plow disc 456. If desired, a third cutting member comprising a cutting blade 464 may be mounted to the upper plow beam 440 above the upper plow disc 456.

When a single plow disc is mounted on the tractor T as in the embodiment of FIGURE 1, it is normally possible to cut to a depth of approximately 3–3½ feet. However, by using a pair of plow discs with one mounted above the other as in the embodiment of FIGURES 16–18 it is possible to cut to a depth of about 6 feet. A still deeper cut may be made if the third cutting blade 464 is utilized. It is important to note that the upper plow disc 456 is mounted substantially above the lower plow disc 444, but nevertheless is positioned so that the lower end of the disc 456 extends somewhat below the top edge of the plow disc 444. It is also important to note that the upper plow disc 456 is mounted forwardly of the lower plow disc 444, and with such an arrangement the lower plow disc 444 will dump earth on the right side of the conveyor belt 406 as viewed in FIGURE 16 while the upper plow disc 456 will dump earth on the left side of the belt 406. It is preferred that a relatively wide conveyor belt be utilized in order to handle the unusually large amount of earth which will be delivered to the conveyor by the two plow disc members operating simultaneously.

In the foregoing embodiment each of the plow disc members 444 and 456 is approximately four feet in diameter, and as indicated above the use of a single such plow disc permits cutting to a depth of approximately 3 to 3½ feet. It is not feasible to use a single plow disc of a substantially larger diameter than the foregoing size because it would then be necessary to handle unusually large chunks of earth. On the other hand, we have found that by use of the two plow discs arranged one above the other as described herein it is possible to cut a depth of six feet without difficulty. By cutting to such a substantial depth a great amount of time and expense is saved in carrying out a given job, and in addition we have found that a much better soil is obtained. That is, the top soil is less desirable because it does not compact well, and by using the two plow discs as described herein the top soil will be mixed with the deeper soil thus providing a final mix which will give good compaction when the mix is later used in constructions of roads, overpasses, etc.

Another important feature of the invention relates to a ground engaging wheel 466 which is supported from the upper plow beam 440 and serves to control the depth of cut as well as to assist in stabilizing the tractor against the cutting or side draft forces which are developed. It will be seen in FIGURE 16 that a beam 468 is welded to the end of the upper plow beam 440 and extends forwardly and downwardly therefrom. The forward end of the beam 468 carries a slide assembly including a back plate 470 and a pair of retainer plates 472 and 474. A further beam member 476 extends forwardly and somewhat downwardly from the forward end of the beam 468. The beam 476 has a slide plate member 478 welded to its rear end, and the plate 478 is adapted to slide laterally along the front face of the back plate 470 with the upper edge of the slide plate retained by the retainer plate 472 and the lower edge of the slide plate retained by the plate 474. As shown in FIGURE 17, a hydraulic cylinder 480 has one end connected to lugs 482 which are affixed to the beam member 468, while the opposite end of a corresponding piston rod 483 is connected to lugs 484 formed on the slide plate member 478. Accordingly, by operation of the hydraulic cylinder 480, which may be controlled by an operator sitting in the cab of the tractor, it is possible to adjust the lateral position of the beam 476.

At the outer end of the laterally movable beam 476 there is welded thereto a shoe member 486. The beam 476 is inclined downwardly as described hereinabove, but the shoe member 486 is positioned relative to the beam 476 so that the shoe extends approximately vertically with the side wall 488 thereof disposed approximately in a fore and aft plane. The forward end of the shoe includes an inwardly inclined leading edge portion 490. On the inside of the shoe member 486 (as best shown in FIGURE 18) there is provided a slide assembly 487 including a back plate 492 and a pair of spaced retainer plates 494 and 496. A slide plate 498 having a wheel axle 500 secured thereto is vertically slidable in the slide assembly 487 with the opposite vertical edges of the slide plate being retained by the retainer plates 494 and 496.

It will be understood that the ground engaging wheel 466 is mounted on the axle 500 and is vertically adjustable relative to the beam 476 in order to adjust the depth of cut taken by the lower plow disc 444. A hydraulic cylinder 502 (see FIGURE 18) has one end pinned to lugs 504 which are welded to the top of the shoe member 486, and the opposite end of the corresponding piston rod member 506 is pinned to the vertically adjustable slide plate 498 as shown at 508. Consequently, by operation of the hydraulic cylinder 502, which may be controlled by an operator sitting in the cab of the tractor, it is impossible to adjust the vertical height of the ground-engaging wheel 466 thereby to control the depth of the cut taken by the lower plow member 444.

It will be understood that when the foregoing apparatus is operated on level ground it will initially cut into the earth to a depth controlled by the height of the ground-engaging wheel 466 relative to the height of the lower plow disc 444, the depth of cut being controlled through selective positioning of the wheel 466 by operation of the vertical hydraulic cylinder 502. After a furrow is formed in the ground and a further pass is made so as to cut to a deeper depth, the ground-engaging wheel 466 rides at the base of the furrow, and due to the inclination of the wheel 466 it will in effect ride against the side edge of the bank at the bottom thereof so as to assist in stabilizing the earth handling apparatus against the cutting or side draft forces which tend to pull such apparatus into the bank. It is also important to note, however, that as soon as the furrow is deep enough so that the lower end of the shoe 486 reaches the side of the bank, the stabilization of the earth handling apparatus against the cutting forces will be provided largely by engagement of the side face 488 of the shoe against the side of the bank.

The shoe 486 is made relatively long in the vertical direction so that the furrow need only be approximately one foot deep before the shoe will be able to engage the side of the bank. Thereafter, the shoe face 488 will ride in engagement with the side of the bank during an earth cutting operation so as to stabilize the apparatus against the cutting or side draft forces, and it has been found that with such a shoe the tractor requires virtually no steering as it travels along the bottom of a furrow while the plow discs remove additional earth from the side of the bank. It is also important to understand that the width of a cut is controlled by adjustment of the lateral position of the wheel 466 and shoe 486 relative to the plow discs 444 and 456. Thus, through operation of the horizontal hydraulic cylinder 480, the lateral position of the wheel 466 and the shoe 486 are adjusted relative to the plow discs, and through such adjustment it is readily possible to control the width of the cut, i.e., the amount by which the plow discs 444 and 456 dig into the side of the bank.

Another feature of the embodiment of FIGURES 16–18 relates to the stabilization of the conveyor 400 against tilting movement about its own longitudinal axis. It will be understood that the upper end of the conveyor 400 is pivotally supported on the wheel carriage 410 by the pivot pin 510 shown in FIGURE 18. Moreover, as in the embodiment of FIGURE 11, a lift or balance arm 512 (see FIGURE 16) is provided for raising the lower end of the conveyor 400 by means of a pair of chains 514 and 516, and the arm 512 is pivotally suspended from a lift arm 518 by a pivot pin 520. Accordingly, both the upper and lower ends of the conveyor arm are pivotally mounted.

When the conveyor 400 is in operation it will tend to be stabilized by means of the large shoe 408 at the lower end of the conveyor which normally rides along the surface of the ground. In addition, a stabilizing arm 522 has one end connected to the side arm 420 of the tractor's U-shaped frame 418, the connection being toward the rear of the arm 420 as shown at 524 in FIGURE 18, and the other end of the arm 522 is connected to the wheel carriage 410 as best shown at 526 in FIGURE 17. It will be understood that the stabilizing arm 522 ties the upper or outer end of the conveyor 400 to the tractor T thereby preventing the outer end of the conveyor from swinging forwardly or rearwardly relative to the tractor as the entire assembly moves forwardly during an earth removal operation. The stabilizing arm 522 comprises and outer cylinder 528 and an inner rod 530 which is telescoped within the cylinder 528. In the embodiment shown in FIGURE 17, the rod 530 is fixed relative to the cylinder 528 by means of a cross pin 532, and it will be understood that a plurality of holes may be provided in the rod 530 or other means provided for permitting adjustment of the length of the stabilizer arm 522.

A further stabilizer arm 534 has one end connected to the side arm 420 of the tractor's U-shaped frame 418, the connection being toward the rear of the arm 420 as shown at 536 in FIGURES 17 and 18, and the other end of the arm 534 is connected to the side of the conveyor 400 intermediate the ends thereof as shown at 538, the latter point of connection being relatively high on the conveyor approximately at the level of the motor-mounting platform 414 of FIGURE 16. The stabilizing arm 534 thus connects one side of the conveyor 400 to the tractor T so as to prevent the conveyor from pivoting about its own longitudinal axis. Such stabilization is not especially necessary when the conveyor shoe 408 is riding along the ground surface, since such shoe in conjunction with the ground will in effect stabilize the conveyor, but the function of the arm 534 becomes important when the lower end of the conveyor is raised above the ground.

The stabilizing arm 534 comprises an outer cylinder 540 and an inner rod 542 which is telescoped within the cylinder. In the embodiment shown, the rod 542 is fixed relative to the cylinder 540 by means of a clamp member 544, and it will be understood that such clamp member may be loosened to permit adjustment of the overall length of the arm 534. The length of the arm 534 is normally adjusted so as to maintain the conveyor 400 in an upright position when its lower end is resting on the ground surface, as best shown in FIGURE 18. It will be noted that without the stabilizer arm 534, the conveyor 400 could tilt or pivot about its longitudinal axis when its lower end is raised above the ground. That is, the upper outer end of the conveyor is pivotally supported by the wheel carriage 410 at the horizontal pivot 510, and the lower inner end when raised above the ground is pivotally supported at the horizontal pivot 520 where the beam 518 connects with the beam 512.

The conveyor 400 is also connected at one side to the front beam 424 of the U-shaped frame 418 by a slide assembly indicated generally at 546 in FIGURES 17 and 18, such an assembly being more fully described earlier herein in conjunction with FIGURES 5–7. However, it will be understood that the slide assembly 546 transmits only fore and aft forces between the U-shaped frame 418 and the conveyor 400 and will not stabilize the conveyor against rotation about its own axis when its lower end is lifted above the ground, However, by providing the stabilizer arm 534 as a direct connection between the side arm 420 of the U-shaped frame and one side of the conveyor 400, the latter connection being located at a relatively high point approximately at the height of the engine platform 414 of FIGURE 16, the conveyor will be stabilized against tilting about its own axis in all positions thereof.

We claim:

1. A materials handling attachment for a tractor comprising a fore and aft extending beam having inwardly angled fore and aft ends and a normally disposed inwardly extending arm spaced from its aft end, said aft end and laterally extending arm being adapted for connection to one leg and the bight of an elevatable U-frame of a tractor respectively to locate the beam forwardly of the tractor and to one side thereof, a ground engaging wheel having its axle mounted to said inwardly angled fore end of the beam to turn on an axis approximately paralleling said inwardly extending connection arm, a plow suspended from said beam intermediate its fore and aft ends, and an inclined conveyor detachably connected to said inwardly extending connection arm and extending laterally from the plow beam, the lower end of said inclined conveyor occupying space in front of the tractor when connected thereto with its lower end adjacent the plow, and a wheeled carriage supporting the outer end of said inclined carrier.

2. A materials handling attachment as claimed in claim 1 further provided with independently operating means for individually adjusting the height of said outer and lower ends of the inclined conveyor.

3. A materials handling attachment as claimed in claim 1 having means for vertically adjusting the height of the ground engaging wheel axle relative to the fore end of said beam and means for adjusting said wheel axle inwardly and outwardly relative to the axis of the fore and aft extending beam.

4. A materials handling attachment as claimed in claim 1 wherein means are provided by which the conveyor may be hitched to the rear end of the tractor when detached from its connection with the plow supporting beam.

5. A materials handling attachment for a tractor by which it may be converted to an elevating grader or the like comprising a fore and aft extending plow beam having a normally disposed connection arm by which it may be removably secured to the bight of an elevatable frame of the tractor extending across the front thereof, an adjustably mounted ground engaging wheel supporting the fore end of the plow beam at a required height and a plow suspended from said beam intermediate the ends thereof, and an inclined conveyor extending laterally from said plow beam with its lower end adjacent and the plow and in front of the tractor, a pair of interconnected members, one being vertically slidable relative to the other, one said members being pivotally connected to said connection arm to turn on a first horizontal axis and the other member being pivotally connected to said lower end of the conveyor to turn on a horizontal axis at right angles to said first horizontal axis, adjustable suspension means for supporting said lower end of the conveyor, said interconnected slide members accommodating adjustment of the height of said conveyor by said suspension means while retaining the conveyor connected to said connection arm of the plow beam, and a wheeled carriage supporting the upper end of the inclined carriage.

6. A materials handling attachment as claimed in claim 5 wherein said slide members are detachably connected to permit separation of the conveyor from the plow beam connection arm, and means by which the conveyor may be detachably hitched behind the tractor for transport.

7. A materials handling attachment as claimed in claim 5 wherein said wheeled carriage includes means for adjusting the relative height of the conveyor end supported thereby.

8. A materials handling attachment as claimed in claim 5 wherein the fore end of the plow supporting beam is angled inwardly and is provided with an axially adjustable portion to which the ground engaging wheel mount is secured to accommodate varying the lateral spacing of the ground engaging wheel from the path of the plow.

9. A material handling attachment as claimed in claim 8, wherein the ground engaging wheel mount comprises a pair of interconnected members vertically adjustable relative to each other, one of said members being secured to the axially adjustable portion of the plow beam fore end and the other member rotatably supporting the ground engaging wheels, means for vertically sliding one of said members relative to the other to alter the height of the plow relative to the ground engaging wheels and means locking said members in a vertically adjusted relation.

10. A materials handling attachment for a tractor by which it may be adapted as an elevating grader, said attachment comprising, in combination, fore and aft plow beam means attached at its rear end to an elevatable frame portion of the tractor and extending forwardly therefrom, lower plow disc means supported from said plow beam means in a generally upright position, upper plow disc means supported from said plow beam means in a generally upright position at a substantially greater height than said lower plow disc means, an adjustable beam extension on the forward end of said plow beam means, a ground-engaging member carried by said beam extension, and an inclined conveyor extending laterally inwardly and upwardly from said plow disc means with its lower end adjacent and forwardly of said lower plow disc means, said upper and lower plow disc means being positioned with their outer edge portions disposed outwardly of said plow beam means so as to present cutting edges for simultaneous removal of earth from respective upper and lower portions of a bank of earth when said attachment is moved along said bank by said tractor, and said upper and lower plow disc means being positioned so as to face forwardly and somewhat inwardly toward the lower end of said conveyor so that earth removed from said bank by said plow disc means will be dumped on the lower end of said conveyor.

11. The invention of claim 10 where said lower and upper plow disc means are positioned with one of the plow disc means disposed forwardly of the other so that one plow disc means will dump earth on one side of the inclined conveyor and the other plow disc means will dump earth on the other side of the same conveyor.

12. The invention of claim 11 where said lower and upper plow disc means are arranged so that the lower edge of said upper plow disc means is disposed below the upper edge of said lower plow disc means.

13. The invention of claim 11 where each of said lower and upper plow disc means does not exceed approximately 48 inches in diameter.

14. The invention of claim 10 where said adjustable beam extension is movable laterally relative to said plow beam means and where said ground-engaging member comprises a wheel which is adjustable vertically relative to said beam extension.

15. The invention of claim 14 where a first hydraulic piston-cylinder actuator member is provided to move said beam extension and said wheel laterally relative to said plow beam means for adjusting the width of cut taken by said lower and upper plow disc means, said first actuator member being generally horizontal and being interconnected between the forward end of said plow beam means and said adjustable beam extension, and a second hydraulic piston-cylinder actuator member is provided to move said wheel vertically relative to said beam extension for adjusting the depth of cut taken by said lower plow disc thereby affording remote control of the vertical and lateral position of said ground-engaging wheel member to control both depth and width of cut, said second actuator member being generally vertical and being interconnected between the outer end of said adjustable beam extension and said wheel.

16. A materials handling attachment for a tractor by which it may be adapted as an elevating grader, said attachment comprising, in combination, fore and aft plow beam means attached at its rear end to an elevatable frame portion of the tractor and extending forwardly therefrom, a plow supported from said plow beam means, an adjustable beam extension on the forward end of said plow beam means, a ground-engaging member carried by said beam extension, an inclined conveyor extending laterally from said plow beam means with its lower end adjacent and forwardly of said plow, and a shoe member carried on said beam extension, said shoe member being positioned on the outside of said beam extension for engagement with the side of a bank of earth as said attachment is moved along a furrow by said tractor during an earth removal operation, said shoe through continuous engagement with the side of said bank serving to guide said attachment and stabilize the same against side draft forces created by the operation of said plow.

17. The invention of claim 16 where said shoe is oriented generally vertically and is formed with a generally flat outer side face for engagement with said bank, said side face being disposed approximately in a fore and aft plane.

18. The invention of claim 16 where said ground-engaging member comprises a wheel and where said beam extension is adjustable laterally relative to said plow beam means so as to permit adjustment of the lateral position of said wheel and said shoe relative to said plow.

19. The invention of claim 18 where a hydraulic piston-cylinder actuator member is provided for moving said beam extension laterally relative to said plow beam means, said actuator member being generally horizontal and being interconnected between the forward end of said plow beam means and said adjustable beam extension.

20. A materials handling attachment for a tractor by which it may be adapted as an elevating grader, said attachment comprising, in combination, fore and aft plow beam means attached at its rear end to an elevatable frame portion of the tractor and extending forwardly therefrom, a plow supported from said plow beam means intermediate the ends thereof, a ground-engaging member supported from the forward end of said plow beam means, an inclined conveyor extending laterally from said plow beam means with its lower end adjacent and forwardly of said plow, a wheel carriage for pivotally supporting the upper end of said conveyor, elevatable lift means for pivotally supporting the lower end of said conveyor, said lower end of said conveyor normally being permitted to ride on the ground surface during an earth removal operation, and rigid stabilizer strut means connected between one side of said conveyor and said elevatable frame portion of said tractor for stabilizing said conveyor against tilting movement about its own axis when the lower end of said conveyor is raised above said ground surface.

21. The invention of claim 20 where said rigid stabilizer strut extends approximately in a fore and aft direction and is inclined substantially upwardly from said elevatable frame to said conveyor.

22. The invention of claim 20 where said rigid stabilizer strut is adjustable in length and where the length thereof is determined so as to maintain said conveyor in an approximately upright position when the lower end of said conveyor is resting on said ground surface.

References Cited

UNITED STATES PATENTS

| | | | |
|---|---|---|---|
| 2,089,319 | 8/1937 | Wooley et al. | 37—110 |
| 2,178,731 | 11/1939 | Turnham | 37—110 |
| 2,199,239 | 4/1940 | Griffith et al. | 37—110 |
| 2,555,335 | 6/1951 | Gulick | 37—110 |
| 3,345,764 | 10/1967 | Malsam | 37—110 |

ROBERT E. PULFREY, Primary Examiner

E. H. EICKHOLT, Assistant Examiner